March 31, 1936.    J. V. SCHAFER    2,035,924
FISHING REEL
Filed Dec. 23, 1933
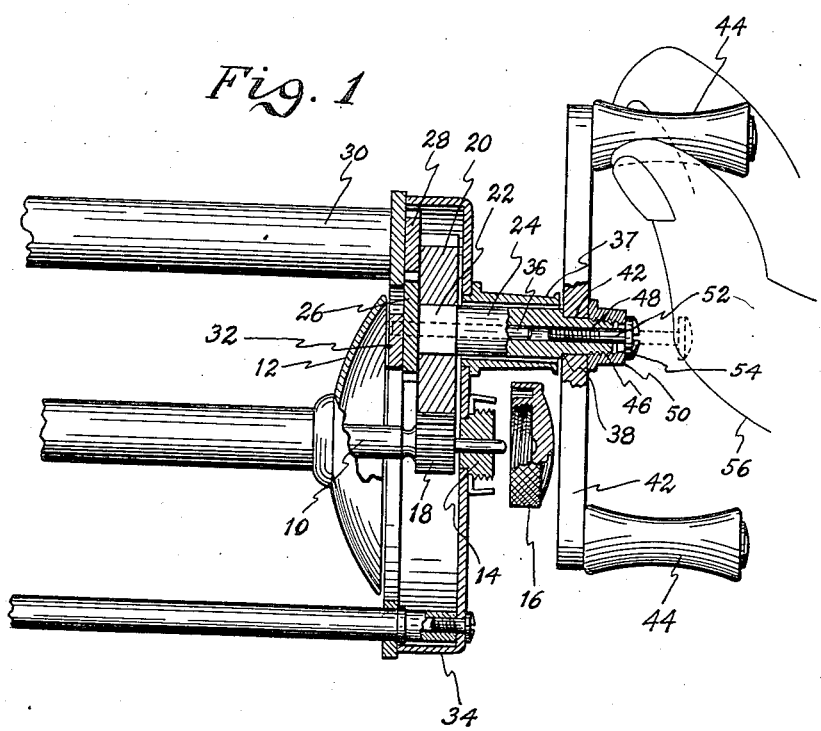
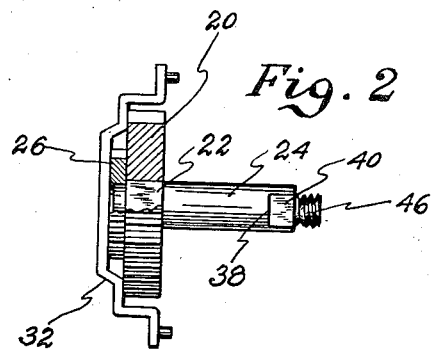
Inventor
JOHN V. SCHAFER.
By Freeman and Sweet
Attorneys.

Patented Mar. 31, 1936

2,035,924

UNITED STATES PATENT OFFICE 2,035,924

FISHING REEL

John V. Schafer, Bronson, Mich., assignor to Bronson Reel Company, Bronson, Mich., a corporation of Michigan Application December 23, 1933, Serial No. 703,769

10 Claims. (Cl. 242—84.1)

My invention relates to fishing reels and includes among its objects and advantages an increase in the margin of safety against loss of parts, particularly at a time when the loss of parts might be serious.

In the accompanying drawing:

Figure 1 is a partial section through a fishing reel indicating the application of the principles of my invention thereto; and Figure 2 is a detail of the main drive gear and supporting bridge.

In the embodiment selected to illustrate the invention the reel comprises the usual spool having a shaft 10 and flanges 12. The end of the shaft is suitably journaled at 14 and end play is taken up by means of the adjusting cap nut 16. The shaft carries a pinion 18 driven by a main driving gear 20 which rides on a squared portion 22 of the drive sleeve 24. The drive sleeve passes through the gear 20 and carries a smaller gear 26 meshing with the pinion 28 for driving the usual level winding mechanism 30. The bridge 32 is rigidly fastened at its ends to the end plate 34 and carries a stud 36 on which the sleeve 24 is pivotally supported. A housing 37 covers the portion of the sleeve 24 projecting outside the end plate 34.

The sleeve 24 has a shoulder at 38 at the end of a partially squared portion 40 which has driving engagement with a hole in the center of the crank 42, which crank is illustrated as equipped with handles 44 at both ends. The sleeve 24 extends beyond the squared portion 40 and has external threads at 46. Beyond the end of the stud 36 the bore of the sleeve is internally threaded as at 48 and the pitch, or number of threads per inch, is the same for the internal threads 48 and the external threads 46.

The crank 42 is fastened in place in the first instance by the nut 50 threaded on the threads 46 and bearing against the face of the crank to clamp it against the shoulders 38. A fastening screw 52 is threaded into the bore engaging the threads 48 and its head 54 overlies and bears against the outer end of the nut 50.

The screw 52 may be removed to put oil in the bore, which will work down around the stud 36 and lubricate the bearing, and this removal does not necessarily involve any loosening of the nut 50. Because the pitch of the internal and external threads is the same, the screw 52, when tightened down, engages the nut 50 in the same way that an ordinary locking nut would, and thereby materially reduces the possibility of the parts working loose. At the same time, if an inexperienced person attempts to remove the parts by turning the nut 50, there is no differential action between the two sets of screw threads such as might wedge the parts too tightly or injure the threads.

The length of the threaded engagement between the screw 52 and the bearing is such that both the nut 50 and the screw can be withdrawn to the right in Figure 1 to such an extent that the nut 50 is completely unscrewed from the sleeve 24 and dangles loosely while the screw 52 is still in threaded engagement with the bore. The length of the screw is also sufficient so that before it works loose and falls off, the head of the screw will be so far to the right as to strike the fingers of the person operating the reel and thus apprise the operator that the screw is loose and needs to be tightened up. I have indicated the position of an operator's thumb at 56, and it will be apparent that even with a double handled crank, the fingers of the operator will be scratched by the head of the screw during the ordinary normal use of the device, before the screw falls out.

Such devices are often used in remote places where repair parts are not available and under such circumstances the loss of the screw would spoil the trip unless the user had taken the unusual precaution of bringing along an extra screw or an extra reel.

Without further elaboration, the foregoing will so fully explain the gist of my invention that others may, by applying knowledge current at the time of application, readily adapt the same for use under various conditions of service.

I claim:

1. In a fishing reel; a frame; a spool journaled in said frame; a rotary drive shaft extending from one end of said frame on an axis parallel to but offset from the spool axis, said shaft having a non-circular portion for driving engagement with an actuating crank, an externally threaded end portion beyond said non-circular portion, and an internally threaded oil bore coaxial with and inside said externally threaded and non-circular portions, the pitch of the external and internal threads being the same; a crank mounted on said non-circular portion, an annular internally threaded retaining member threaded over said externally threaded portion and abutting said crank to retain it in assembled position; an externally threaded plug member threaded into said bore and having a head overlying the outer end of said retaining member;

the length of the threaded engagement between said bore and said plug member being such that the parts can be screwed out to completely unscrew said retaining member while said plug member is still held by its threads, and such that the plug member will obstruct the manual operation of the reel before becoming completely unscrewed.

2. In a fishing reel; a frame; a spool journaled in said frame; a rotary drive shaft extending from one end of said frame, a crank mounted on said shaft and having driving engagement therewith; two threaded retaining members for said crank, the length of the threaded engagement between one of said retaining members and said shaft being such that the member will obstruct the manual operation of the reel before becoming completely unscrewed.

3. In a fishing reel; a frame; a spool journaled in said frame; a rotary drive shaft extending from one end of said frame, a crank mounted on said shaft and having driving engagement therewith; two threaded retaining members for said crank, the length of the threaded engagement between one of said retaining members and said shaft being such that the member will obstruct the manual operation of the reel before becoming completely unscrewed, one of said threaded members engaging the other to function as a lock nut.

4. In a fishing reel; a frame; a rotary driving element; a crank having an aperture receiving one end of said element to drive said element; a nut threaded over the end of said element to fasten said crank in place; said element having a threaded bore; and a lock screw threaded into said bore and engaging said nut to clamp the nut against unscrewing; the pitches of the threads of said nut and lockscrew being such that both the nut and the lockscrew can be unscrewed together by turning said nut.

5. In a fishing reel: a frame; a rotary driving element; a crank having an aperture receiving one end of said element to drive said element; a short threaded retaining member and a long threaded retaining member, both having threaded engagement with said rotary driving element; said short threaded retaining member having clamping engagement with said crank; the pitches of the threads on said retaining members being such that both retaining members can be unscrewed together by turning said short retaining member.

6. In a fishing reel: a frame; a rotary driving element; a crank having an aperture receiving one end of said element to drive said element; a short threaded retaining member and a long threaded retaining member, both having threaded engagement with said rotary driving element; said short threaded retaining member having clamping engagement with said crank; the length of said long retaining member being such that both retaining members can be unscrewed sufficiently to unscrew said short retaining member while said long retaining member is still only partially unscrewed.

7. In a fishing reel: a frame; a rotary driving element; a crank having an aperture receiving one end of said element to drive said element; a short threaded retaining member and a long threaded retaining member, both having threaded engagement with said rotary driving element; said short threaded retaining member having clamping engagement with said crank; said long retaining member having clamping contact with said short retaining member.

8. In a fishing reel: a frame; a rotary driving element; a crank having an aperture receiving one end of said element to drive said element; a short threaded retaining member and a long threaded retaining member, both having threaded engagement with said rotary driving element; said short threaded retaining member having clamping engagement with said crank; the length of said long retaining member being such that both retaining members can be unscrewed sufficiently to unscrew said short retaining member while said long retaining member is still only partially unscrewed; said long retaining member having clamping contact with said short retaining member.

9. In a fishing reel, in combination: a crank; driven means assembled with said crank; threaded retaining means for holding said crank and driven means in assembled relationship; and threaded fastening means for said retaining means; said fastening means having engagement with the assembled parts of such length that the fastening means will obstruct the movement of the operator before it falls entirely out of assembled relationship; the pitches of the threads on said retaining and fastening means being such that both the retaining and fastening means can be unscrewed together by turning said retaining means.

10. In a fishing reel, in combination: separable parts; threaded retaining means for holding said parts in assembled relationship; and threaded fastening means for said retaining means; said fastening means having engagement with the assembled parts of such length that the fastening means must move to a position obstructing the movement of the operator before it falls entirely out of assembled relationship; the pitches of the threads on said retaining and fastening means being such that both the retaining and the fastening means can be unscrewed together by turning said retaining means.

JOHN V. SCHAFER.